Jan. 19, 1954 R. J. SCHWARZ 2,666,339
SAFETY HANDLE STRUCTURE FOR STRAIGHT PULL BRAKE LEVERS
Filed March 9, 1951 2 Sheets-Sheet 1
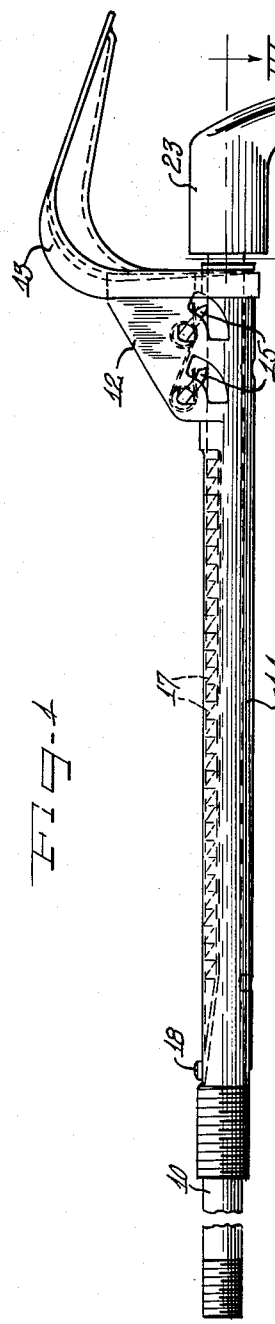
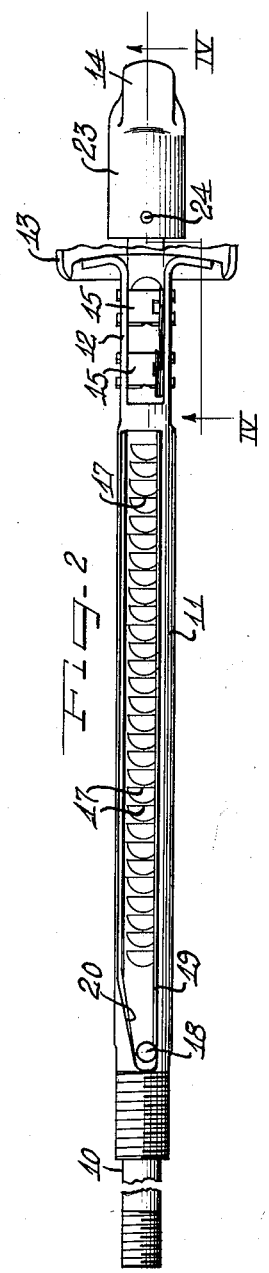
Inventor
Richard J. Schwarz

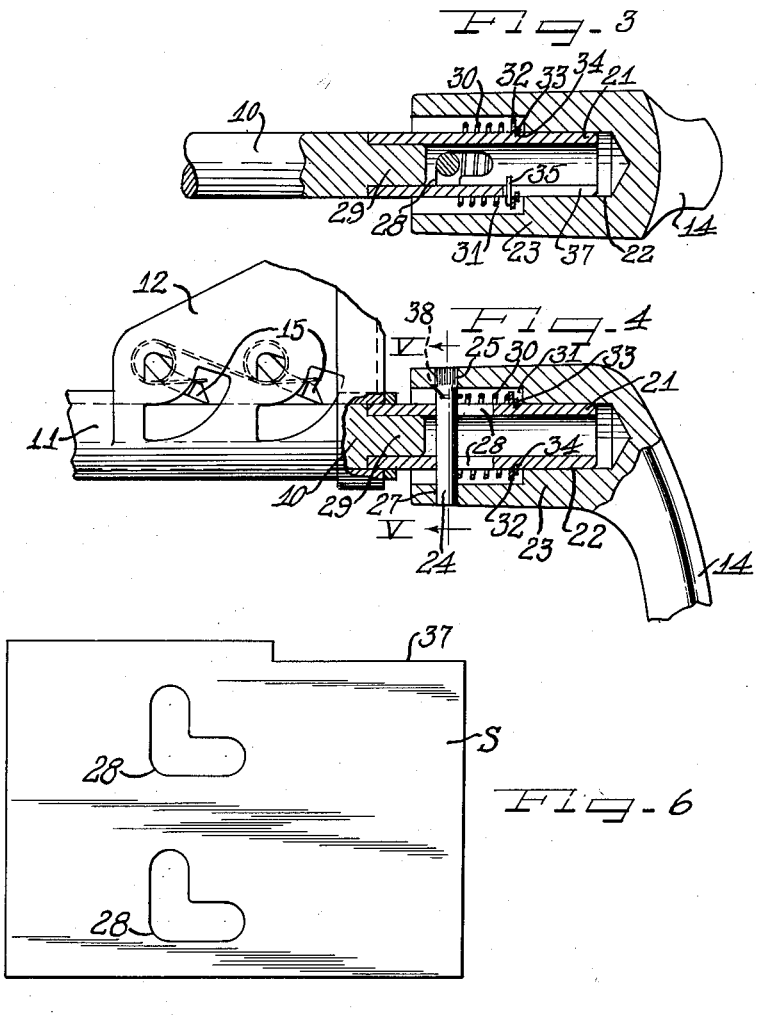

Patented Jan. 19, 1954

2,666,339

UNITED STATES PATENT OFFICE 2,666,339

SAFETY HANDLE STRUCTURE FOR
STRAIGHT PULL BRAKE LEVERS

Richard J. Schwarz, Lombard, Ill., assignor to
Houdaille-Hershey Corporation, Detroit, Mich.,
a corporation of Michigan Application March 9, 1951, Serial No. 214,741

14 Claims. (Cl. 74—503)

1

The present invention relates to improvements in safety handle constructions for straight pull brake levers and is more particularly concerned with the provision of novel means for avoiding accidental release of the brake lever assembly from a brake setting position.

An object of the present invention is to provide improved safety handle structure for straight pull brake lever assemblies wherein the handle will swing about the pull rod of the assembly and thus afford a substantial safety factor against accidental release of the brakes.

Another object of the invention is to provide a safety handle for straight pull brake levers wherein manipulation of the handle alone is effective to operate the safety mechanism.

A further object of the invention is to provide a safety handle assembly for straight pull brake levers affording a simple and economical structure embodying but a small number of parts that can be produced and assembled by low cost mass production methods of manufacture.

Other objects, features and advantages of the present invention will be readily apparent from the following detailed description of a preferred embodiment thereof taken in conjunction with the accompanying drawings, in which:

Figure 1 is a side elevational view of a straight pull brake lever assembly embodying the invention;

Figure 2 is a top plan view of the brake lever assembly;

Figure 3 is an enlarged sectional detail view taken substantially on the line III—III of Fig. 1;

Figure 4 is a partially sectional and partially side elevational view, on an enlarged scale, of the safety handle structure taken substantially on the line IV—IV of Fig. 2;

Figure 5 is an enlarged transverse sectional detail view taken substantially on the line V—V of Fig. 4;

Figure 6 is a developed plan view of the connector sleeve structure of the safety handle assembly; and Figure 7 is a side elevational view of the connector sleeve as it appears in formed up tubular condition.

The present invention is especially useful with a straight pull brake lever construction such as shown in Figs. 1 and 2 including a pull rod 10 reciprocably and rotatably supported by a guide tube housing 11. At its forward end portion the rod 10 is constructed and arranged for attachment to a brake setting cable and the forward end portion of the guide tube 11 is constructed

2 and arranged for attachment to a fixed part of a vehicle such as the dash panel.

At its rear end portion, the tubular housing member 11 has upstanding housing wall portions 12 which are secured to an attachment bracket structure 13 by which the rear end portion of the assembly is attached to a portion of a vehicle such as an automobile adjacent to the inside of the automobile such as the instrument panel.

For setting a vehicle brake, such as the emergency or parking brake of the vehicle, by use of the straight pull brake lever assembly disclosed, a handle 14 mounted on the rear end portion of the pull rod 10 is manipulated to pull the rod 10 rearwardly until the brake has been set. In the brake setting position of the rod 10 pivoted pawls 15 supported by the housing wall portions 12 engage with ratchet teeth 17 disposed in longitudinal series on the rod 10.

For releasing the brake, the rod 10 is rotated by manipulation of the handle 14 to disengage the ratchet teeth 17 from the pawls 15, and then by presenting a straight, untoothed surface of the pull rod 10 to the pawls forward sliding of the pull rod 10 releases the brake. Limit upon rotary movement of the rod 10 is controlled by a pin 18 projecting from the rod 10 into a longitudinal slot 19 in the tubular housing 11 and of a width such that when the pin 18 engages one longitudinal edge defining the slot the ratchet teeth 17 are in ratcheting position as shown in Fig. 2, while when the pin 18 engages the opposite longitudinal edge limit upon brake releasing rotary movement is accomplished to prevent full turning of the pull rod and thus possible twisting or distortion of the brake cable. At its forward end portion, the brake release limiting edge defining the slot 19 has a cam surface 20 which positively returns the pin 18 and thus the rod 10 into the ratcheting position.

In order to avoid accidental release of the brake after the pull rod 10 has been pulled rearwardly by means of the handle 14 into a brake setting position, means are provided for in effect disconnecting the handle 14 from the rod 10 for safety purposes until it is desired to release the brake. To this end, a safety disconnect clutch mechanism is provided between the rod and the handle. To this end, the rear end portion of the pull rod 10 comprises a clutch section 21 slidably engaged within a forwardly opening bearing socket 22 within a hub portion 23 of the handle 14. A clutch bar 24, preferably in the form of a pin driven into fixed position through and into aligned bores 25 and 27 intersects the socket 22 diametrically adjacent to the forward end portion of the handle hub 23 and also extends diametrically through the clutch section 21 of the rod.

While the clutch section 21 of the rod may, if convenient, be in one piece with the body of the rod 10, a desirable, economical expedient comprises formation of the clutch section 21 from a sheet metal stamping S (Fig. 6) formed with a spaced, transversely aligned pair of generally L-shape apertures 28 having the respective legs thereof similarly disposed, with one leg aligned with the leg of the companion aperture on an axis normal to the longitudinal axis of the piece S, while the remaining legs of the apertures extend in parallel relation longitudinally of the piece S. The transverse spacing of the apertures 28 is such that upon forming the piece S into tubular shape, as shown in Figs. 3, 4 and 7, the apertures 28 are disposed at diametrically opposite sides of the tube. The external diameter of the finished tube 21 is preferably, although not necessarily, of the same diameter as the outside diameter of the rod 10. Attachment of the clutch section 21 to the rod 10 is effected by assembling the forward end portion of the tube about a reduced diameter portion 29 on the rear end of the rod 10 and affixing the tube as by brazing or the like. After assembly has been completed, the apertures 28 lie adjacent to the extremity of the reduced diameter anchoring lug 29 of the rod and with a substantial portion of the clutch tube 21 projecting rearwardly for bearing purposes into the socket 22 of the handle hub.

It will thus be seen that after the handle 14 has been assembled on the clutch section 21, and with the clutch bar pin 24 driven into place through the aligned handle hub apertures 25 and 27 and through the diametrically aligned clutch section apertures 28, the handle is operatively connected to the pull rod 10. Rearward pulling on the handle 14 causes the pull rod 10 to be drawn rearwardly by reason of the interconnection between the clutch pin 24 and the rear edges defining the clutch apertures 28 in the clutch section tube 21. The transversely disposed legs of the clutch apertures 28 afford substantial free relative rotary movement of the handle 14 with respect to the rod 10 when the clutch pin 24 is engaged in the transversely extending leg portions of the apertures. On the other hand, when the clutch pin 24 is disposed in the longitudinally extending legs of the apertures full clutching interengagement between the handle and the rod is effected so that turning of the handle will effect turning of the rod. It will be observed that the transversely disposed legs of the clutch apertures are directed clockwise as considered from the rear of the assembly conformable to the clockwise turning of the rod 10 for releasing the brake in the particular assembly chosen for illustration herein, but if brake release is to be effected by counterclockwise rotation of the rod it will be clear that the disconnect legs of the clutch apertures will be directed in the counterclockwise direction. The length of the transversely disposed disconnect legs of the clutch apertures may be such as to afford approximately 45° free clockwise turning of the handle 14 since this has been found to afford an ample safety factor. The range of free turning movement is indicated by the dash outline showing of the clutch pin 24 in Fig. 5.

The longitudinally extending legs of the clutch slots or apertures 28 preferably extend rearwardly, so that for releasing the brake a slight rearward movement of the handle 14 engages the clutch bar or pin 24 in the rearwardly directed legs. Then turning of the handle 14 turns the rod 10 and cams the pawls 15 from the clutch teeth 17. This releases the pull rod 10 to move forwardly to brake releasing position. Of course, if enough room is available for brake-release turning of the handle 14 in addition to the free swinging range of the handle, release of the brake may be effected by adequate further turning of the handle beyond the free turning limit imposed by the length of the aligned transverse legs of the apertures 28. In most installations, however, cramped space will preclude sufficient turning range for such operation of the handle and the rearward aperture legs must be used.

In order positively to maintain the handle 14 in such relation to the pull rod as to assure normal location of the clutch pin 24 in the disconnect portions of the clutch apertures 28, resilient biasing means such as a coiled compression spring 30 is provided encircling the clutch section tube 21 rearwardly from the pin 24 and accommodated in a counterbore enlargement 31 of the handle socket. At its forward end the spring 30 bears against the pin 24 while at its rear end the spring bears against a shoulder washer 32 abutting a crescent retaining ring 33 engaged within an annular radially opening groove 34 provided in the periphery of the clutch section tube 21. Thus, the handle is normally urged forwardly so that when rearward pulling force is released from the handle 14 during a brake setting operation, the handle will snap forwardly on the clutch section 21 of the rod and the clutch pin 24 will bear against the forward ends of the clutch apertures 28 in the safety relationship wherein the handle 14 can turn relative to the rod 10 and thus avoid accidental turning of the rod and release of the brake.

In order to avoid free swinging of the handle 14 when in the safety release or declutching position on the pull rod 10, the biasing compression spring 30 also preferably serves as a resilient torsion member. For this purpose the rear end portion of the spring 30 has an inwardly directed terminal leg 35 which is engaged in a longitudinal slot 37 provided in the rear portion of the clutch section tube 21 for this purpose. At its forward end, the spring 30 has a terminal leg 38 extending forwardly and engaging against the clutch pin 24 with a counterclockwise torque in position so that the handle is thereby normally held in predetermined position relative to the pull rod 10 by engagement of the pin 24 against the longitudinal long edges defining the clutch slots 28, as best seen in Figs. 3 and 5. Should the handle be accidentally turned in opposition to the torsion of the spring 30, the handle will promptly snap back to the at rest position upon release of the turning force. For release of the brake rearward pulling of the handle 14 will readily compress the spring 30 to allow the pin 24 to engage within the rearward legs of the slots 28 for clutching interengagement and turning of the rod 10 upon brake releasing turning of the handle 14. Release of the handle 14 after a brake setting operation or after completion of the brake releasing action, permits the spring 30 to snap the handle back to the safety position.

It will be understood that modifications and variations may be effected without departing from the scope of the novel concepts of the present invention.

I claim as my invention:

1. In a straight pull brake lever structure, a reciprocably and rotatably movable member, means for retaining said member in brake setting position against return to brake releasing position, said means being releasable by turning said member, a handle on said member, and clutch means connecting said handle to said member normally permitting rotation of the handle relative to said member but responsive to limited movement longitudinally relative to said member for effecting an interlock enabling turning of said member by turning of the handle.

2. In combination in a pull rod and safety handle assembly, a pull rod member, a handle having a hub providing a socket rotatably and reciprocably engaging about one end portion of the pull rod, and releasable clutch means connecting the handle and the portion of the pull rod within said socket and affording a range of relative rotary movement of the handle about said engaged end portion of the pull rod in one reciprocal position of the handle on the pull rod and effecting an interlocked relationship of the handle and the pull rod in another reciprocal position of the handle on said end portion of the pull rod so that the pull rod can be turned by turning the handle.

3. In combination in a hand brake lever assembly including a reciprocal and rotary member, means for maintaining the member in brake setting reciprocal position, said means being releasable by turning said member, a handle on said member, and means connecting the handle to said member, said means comprising a coupling member carried by the handle and an apertured portion on said member, said apertured portion and said coupling member having one relationship wherein the handle can turn relative to said first mentioned member and a second relationship wherein the handle and said first mentioned member are interconnected for turning upon turning of the handle.

4. In combination in a straight pull brake lever assembly, a pull rod, means for reciprocably and rotatably supporting the pull rod, means on said supporting means for holding the pull rod in brake setting position when pulled rearwardly relative to the supporting means, a handle on the rear portion of said pull rod, the rear portion of the pull rod and the handle being reciprocally and rotatably relatively movable, and a pin extending transversely on the handle and through an apertured area of said pull rod portion, said apertured area including a portion wherein the pin is movable within a substantial range for free rotation of the handle on the pull rod, said apertured area including another portion engageable by said pin upon limited reciprocal movement of the handle relative to the pull rod for interconnecting the handle and the pull rod for joint rotation upon rotation of the handle.

5. In combination in a straight pull brake lever assembly, a pull rod, a safety handle having a hub portion rotatably and reciprocably engaging about one end portion of the pull rod, said safety handle having a transverse clutch member, the pull rod having a part of said one end portion interengageable with said transverse member upon reciprocal movement of the handle in one direction relative to said one end portion of the pull rod for interconnecting the handle and pull rod for joint rotation and having another part affording a free transverse movement area for said transverse member for releasing said member from said interengagement upon movement of the handle in the opposite reciprocal direction to afford a limited range of relative rotation of the handle and the pull rod.

6. In combination in a straight pull brake lever assembly of the character described, a pull rod, said pull rod having an end portion, said end portion having a section thereof apertured to provide a transverse portion and a longitudinal portion connected to said transverse portion, a handle having a socket within which said end portion is engaged, and a clutch rod extending transversely of the handle through said socket and through said aperture, said clutch rod being engageable within said longitudinal portion of the aperture for effecting interconnection of the handle and pull rod for joint rotation and being movable into said transverse portion of the aperture to permit rotation of the handle relative to the pull rod.

7. In combination in a straight pull brake lever assembly of the character described, a pull rod, said pull rod having an end portion, said end portion having a section thereof apertured to provide a transverse portion and a longitudinal portion connected to said transverse portion, a handle having a socket within which said end portion is engaged, a clutch bar extending transversely of the handle through said socket and through said aperture, said clutch bar being engageable within said longitudinal portion of the aperture for effecting interconnection of the handle and pull rod for joint rotation and being movable into said transverse portion of the aperture to permit rotation of the handle relative to the pull rod, and biasing means normally urging the handle and the pull rod into the relative position wherein said clutch bar is in said transverse aperture enlargement.

8. In combination in a straight pull brake lever assembly, a pull rod having a rear end portion including transverse opening therethrough with generally L-shape apertures at opposite sides having respectively transversely extending legs and rearwardly longitudinally extending legs joined together, a handle having a socket within which said rod portion is engaged, a transverse pin carried by said handle and transversing said socket and extending through said opening, said pin being engageable in the longitudinally extending aperture portions to effect a coupling between the handle and rod for joint rotation of the handle and rod, and being engageable in said transverse aperture legs to permit relative rotary movement of the handle and pull rod to the limits permitted by the length of said transverse legs.

9. In combination in a straight pull brake lever assembly, a pull rod having a rear end portion including transverse opening therethrough with generally L-shape apertures at opposite sides having respectively transversely extending legs and rearwardly longitudinally extending legs joined together, a handle having a socket within which said rod portion is engaged, a transverse pin carried by said handle and traversing said socket and extending through said opening, said pin being engageable in the longitudinally extending aperture portions to effect a coupling between the handle and rod for joint rotation of the handle and rod, and being engageable in said transverse aperture legs to permit relative rotary movement of the handle and pull rod to the limits permitted by the length of said transverse legs, and a torsion spring having one end connected to said handle and the other end connected to said rod portion and normally acting to bias the handle and rod in one rotary direction.

10. In combination in a straight pull brake lever assembly of the character described, a pull rod, a handle mounted rotatably and reciprocably on one end of the pull rod, the end portion of the pull rod engaged by the handle having a transversely apertured structure comprising generally L-shape apertures at diametrically opposite sides of the rod portion and having longitudinally directed and transversely directed legs extending in the same direction, the handle having a pin therethrough extending through said apertures, and a combination torsion and compression spring normally maintaining the pin in the transverse leg portions of the apertures and against the longest longitudinal edge defining said apertures.

11. In combination in a straight pull brake lever assembly of the character described, a pull rod, a tube adapter connected to one end portion of the rod, a handle having a hub including a socket within which said tube is engaged, said tube having diametrically opposite apertures including transversely elongated and longitudinally elongated portions, and pin means carried by the handle and extending into said socket and into said apertures for thereby interconnecting the handle and rod and enabling limited rotary and reciprocal movements of the handle relative to the rod.

12. In combination in a straight pull brake lever assembly, a pull rod, the pull rod being adapted for connection at its forward end to a brake setting cable, a slidable support for the pull rod, said supporting having means engageable with the pull rod to retain the same in brake setting position upon reciprocal rearward movement of the pull rod and being releasable by rotation of the pull rod, a safety handle having a socket, the rear end portion of the pull rod being engaged in said socket, and means connecting the handle to said rear end portion enabling limited reciprocal movement of the handle on said rear end portion, said connecting means affording a range of turning movement of the handle relative to the pull rod in a forward position of the handle on the pull rod and retaining the handle and pull rod for joint rotation responsive to turning of the handle in a rearward position of the handle on the pull rod.

13. In combination in a brake actuating assembly, a supporting structure, an elongated actuating member carried by said supporting structure and having means on one end portion for operative attachment to a brake system, said member being longitudinally reciprocable relative to said structure for brake setting and release purposes, cooperating means on said supporting structure and on said member for retaining said member in brake setting positions relative to the supporting structure, said member being turnable about its longitudinal axis for releasing said cooperating means, a handle reciprocably mounted on the remaining end portion of said member, said handle being swingable relative to said member in one reciprocal position of the handle on the member, yieldable biasing means normally urging the handle into said one reciprocal position, and means operative as an incident to movement of the handle from said one position into a second position and in opposition to said biasing means in response to manually applied force for effecting an interconnection of the handle and said member to turn the member by swinging of the handle while in said second position for releasing said cooperating means to enable longitudinal movement of said member toward brake-releasing position.

14. In combination in a straight pull brake lever safety handle assembly, a pull rod, a handle having a hub portion providing a socket within which an end portion of the rod is rotatably and reciprocably mounted, said hub portion having a part of the wall defining said socket in circumferentially spaced relation about said rod end portion, a shoulder on said rod portion in the space thus provided in the socket, a clutch member on the handle hub spaced from said shoulder within said socket, means on said rod end portion interengageable with said member for effecting clutched and non-clutching relationships of the handle hub portion and rod, and a coiled compression spring encircling said rod end portion and engaging at one end with said shoulder and at the other end with said member and normally biasing the handle hub and rod into one relative reciprocal position.

RICHARD J. SCHWARZ.

References Cited in the file of this patent

UNITED STATES PATENTS

| Number | Name | Date |
|---|---|---|
| 1,547,081 | Swanson | July 21, 1925 |
| 1,713,842 | Link | May 21, 1929 |
| 2,073,108 | Kesling | Mar. 9, 1937 |
| 2,126,234 | Weber | Aug. 9, 1938 |
| 2,362,458 | Arens | Nov. 14, 1944 |
| 2,543,509 | Sandberg | Feb. 27, 1951 |
| 2,543,510 | Sandberg | Feb. 27, 1951 |

FOREIGN PATENTS

| Number | Country | Date |
|---|---|---|
| 293,488 | Germany | Aug. 14, 1916 |